United States Patent Office 2,877,189
Patented Mar. 10, 1959

2,877,189

RUBBER ANTIOXIDANTS IN EXTRUDED FORM

John F. Olin, Ambler, Pa., assignor, by mesne assignments, to Pennsalt Chemicals Corporation, a corporation of Pennsylvania No Drawing. Application June 26, 1953
Serial No. 364,470

10 Claims. (Cl. 252—401)

The present invention pertains to the treatment of rubber, natural or synthetic. It is particularly concerned with new and improved solid compositions for the prevention of oxidation in rubber and with processes for manufacturing said compositions.

The art of preserving rubber is old and the use of chemicals to prevent oxidation in various desired ways is likewise old. The use of antioxidants has introduced certain complexities and problems into the art and many of these problems have heretofore remained either unsolved or only partially solved.

For example, the operations involved in the manufacture and packaging of antioxidants which are solid at ordinary room temperatures frequently give rise to dusting problems due to the flying about of particles of such chemicals in the atmosphere. A dusty condition of this kind is very objectionable for at least two reasons, one of which is the irretrievable loss of considerable amounts of expensive chemical. A second and even more important reason resides in the menace to the health and comfort of operators who must perforce work in the polluted atmosphere.

The same remarks apply to the use of solid antioxidants in rubber compounding, where numerous manipulations are necessary, such as removal of materials from packages, weighing the materials, and incorporating them into rubber formulations. Thus there is ample opportunity for the escape of dust into the atmosphere of the mill room with attendant loss of material and hazards to the health of workmen.

A number of procedures have been proposed for reducing the dusting tendencies of solid antioxidants, among which may be mentioned the compression or nodulizing of the chemicals into pellets and the like and also the treatment of the chemicals with various anti-dusting agents, such, e. g., as hydrocarbon oils, higher fatty acids, casein, gelatin, resinous materials and the like. Such procedures have in general tended to alleviate dusting but have not been entirely satisfactory.

Another difficulty is the poor mechanical stability which is characteristic of many solid antioxidants. For example, many of these compounds, although they are free-flowing powders initially, become caked upon storage. This is often true in the case of powdery materials, including those which have been treated for alleviation of dustiness. Even those compounds which have been compressed or nodulized into various shapes with or without anti-dusting additives, usually have unsatisfactory mechanical stability. Upon being agitated, such as occurs in ordinary handling and shipping, the large particles break up appreciably and objectionable amounts of small dustlike particles are formed.

Many solid antioxidants tend to stick to the mill rolls and in some cases this is quite a serious problem. In those instances where the sticking tendency is marked, it is possible that the mixing of the antioxidant into the rubber formulation will not be uniform. This undesirable condition is particularly true for rubber batches mixed in short time cycles. Proposals for the solution of this problem have been only partially successful.

Still another problem which frequently is quite serious lies in the difficulty with which many solid antioxidants become incorporated into (i. e., dispersed in) rubber formulations. The particle size of some commercial antioxidants undoubtedly contributes to this difficulty in some instances. In many instances, however, it seems as if the formulation being prepared tends to repel the antioxidant to some extent, so that considerable quantities of the chemical escape as dust into the air and/or fall through the mill and into the mill pan. Even though the antioxidant may ultimately disperse uniformly in the formulation and thus serve its intended purpose therein, it is obvious that economy suffers because of an unduly long time cycle with consequent high labor and power costs and also because of loss of material.

This general problem has been so acute that many procedures for its solution have been suggested, some of which are devoid of substantial merit while others have afforded no more than partial solution of the problem.

Generally speaking, the proposals found in the prior art for the solution of problems such as those discussed above have failed in one or more particulars. Some of the proposals afford a partial solution to one or more of such problems, but I am not aware of any proposal which gives a reasonable, simultaneous solution to all such problems.

My antioxidation compositions, on the other hand, afford an excellent solution, in that: (1) dusting is substantially eliminated both during the manufacture of the compositions and during their use in the rubber industry; (2) they have excellent mechanical stability, such as in handling and shipping; (3) in substantially all instances they have no appreciable tendency to stick to mill rolls; (4) they disperse in rubber formulations with superior efficiency; and (5) their particle sizes are acceptably small. It is, of course, recognized that other agents might be found which possess any one or possibly any two or three or even any four of the attributes mentioned above. However, an agent must possess all five attributes if it is to afford improved economy and technical effectiveness.

I have discovered that compositions containing one or more antioxidants which are normally solid at ordinary room temperatures, in intimate admixture with polybutene and/or hydrogenated polybutene are highly effective when used as rubber stabilizers and that the outstanding advantages discussed above accrue from the use of such compositions in the rubber art.

The term "polybutene" is meant to designate any synthetic polymer or copolymer derived by the catalytic polymerization of isobutene or a mixture of isobutene with one or more of butene-1 and butene-2 and having an average molecular weight falling in the range of from about 500 to about 5000, a preferred range being from about 750 to about 3000, with an average molecular weight between approximately 1000 to 1500 being particularly satisfactory. The presence of polymers having molecular weights somewhat less than 500 or somewhat more than 5000 is contemplated within the broad scope of the invention, but I have found that in general the use of such polymers in major amount is not conducive to realizing the maximum advantages of the invention. The same considerations apply to hyrogenated polybutene, which is produced by the hydrogenation of polybutene by any means known in the art.

For convenience, the following description will be made in connection with polybutene, it being understood that it is equally applicable to hydrogenated polybutene.

The polybutene contained in my improved antioxidant does not detract from the stabilizing properties of the active ingredients contained therein. On the contrary, the polybutene acts as a dispersant which improves the ease and speed of incorporation of the antioxidant into the rubber formulation, although the polybutene itself is not an antioxidant.

The relative proportions of solid antioxidant and polybutene contained in my compositions may vary over quite a wide range such as from 0.5% up to 20%, e. g., up to 15% by weight of solid antioxidant. However, I have found that from about 1% to about 10% of polybutene, based on the weight of the solid antioxidant, constitutes a preferred concentration range and more particularly from about 3% to about 6%.

The invention broadly contemplates compositions (and methods of preparing the same) containing polybutene in thorough, intimate admixture with any one or more antioxidants which are solid under ordinary temperature conditions. It is pointed out that the polybutenes are characterized by a high degree of chemical stability in the presence of these compounds.

Substances other than polybutene and antioxidant may be included in the compositions, if desired, particularly materials commonly employed in the rubber art, such as inert materials (e. g., clay and carbon black), zinc oxide, sulfur, and the like. The inclusion of such materials in the compositions falls within the purview of the invention.

Table 1 illustrates some types of antioxidants as well as some specific antioxidants which are employed as active ingredients in my compositions. However, it is to be understood that the invention is not limited to those compounds and types of compounds which are specifically mentioned.

TABLE 1

*Antioxidants*

Monobenzyl ether of hydroquinone
Mixture of phenyl-β-naphthylamine, p-isopropoxy diphenylamine and diphenyl p-phenylene diamine
Mixture of phenyl-β-naphthylamine and diphenyl p-phenylenediamine
Phenyl-β-naphthylamine
N,N'-dibetanaphthyl p-phenylenediamine
Condensation product of acetone and aniline
Phenyl-α-naphthylamine
Di-orthotolylguanidine salt of dicatechol borate
Reaction product of acetone and para amino diphenyl
Phenyl-β-naphthylamine (50%), di-para-methoxy diphenylamine (25%), diphenyl p-phenylamine diamine (25%)
Bis-(2-hydroxy)-3-tert-butyl-5-methylphenyl-methane
Sym-diphenyl-p-phenylenediamine
Reaction product of acetone and diphenylamine
Para cyclohexylaminophenylamine The compositions of this invention are highly suitable for use in all types of rubber compounding, such as in the manufacture of tires, inner tubes, mechanical goods, wire and cable insulation, footwear, drug sundries, cements, dry rubber sponge, and the like. They are likewise highly suitable for incorporation into water dispersions of the kind employed in latex applications, such as in foam or dipped goods operations.

The compositions may be produced in either of two solid forms, namely, as a finely divided free-flowing non-dusting powder or as a mechanically stable, shaped agglomerate in which the discrete particles of the active ingredients are quite fine.

Both forms possess distinct advantages, such as those mentioned above, as compared to the corresponding compounds, untreated or in admixture with additives which have been hitherto employed. However, I somewhat prefer the shaped agglomerated form, such as the extruded product which is described below.

Solid antioxidants, e. g., in the finely divided form in which they are ordinarily employed in rubber compounding, may be mixed with a polybutene in any desired manner, numerous variations of admixing procedures being possible, as will be seen.

The antioxidant may be dry or it may be contained in a moist mass, such as a filter cake, or in a fluid suspension. It is preferred that the liquid present in the filter cake or suspension be low in electrolyte content; otherwise the polybutene sometimes may not admix to best advantage with the active material. Instead, some of the polybutene may tend to coat the walls of the vessel and to remain in part as a separate oily phase.

The polybutene may be used per se, or as an emulsion, such as an aqueous emulsion comprising polybutene dispersed in water with the aid of a small amount of a dispersing agent, such, e. g., as triethanolamine oleate.

Thus it will be seen that polybutene per se may be admixed with dry antioxidants or with these compounds containing appreciable amounts of aqueous or nonaqueous liquid. Likewise, emulsified polybutene may be admixed with dry antioxidants or with these compounds containing liquid. I find that it is not always necessary to break such emulsions upon or after such admixing in order to deposit the polybutene on the antioxidant particles, although this is preferred and may be effected by any means, such as by acidification with water-soluble acids or by other means.

While it is possible to prepare powdery antioxidant-polybutene compounds by any of the modifications listed above, a good procedure is by mechanically admixing the dry active material with polybutene per se. Any means of intimately mixing a relatively large amount of a dry powder with a relatively small amount of a viscous liquid may be employed, such as by kneading, rolling, mastication, mulling, or otherwise. Mixing devices capable of incorporating the viscous liquid (i. e., polybutene) into the powder through the action of grinding or shearing surfaces are suitable.

Powdery forms may also be prepared by adding polybutene per se or emulsified to agitated aqueous suspensions of antioxidants. The suspending medium, for example, may be the medium employed in the chemical preparation of the active material, and/or water added to the dry active material to form a slurry, or otherwise. As has been pointed out, the presence of substantial quantities of electrolytes is sometimes not preferred. This difficulty, however, may be minimized by the use of efficient agitation. The slurry containing the polybutene-treated active material may then be filtered, washed, aired, dried, and pulverized by any convenient means.

Various procedures are available for preparing agglomerated forms of my compositions. Said agglomerated forms may be prepared by extrusion, fin drum flaking, low pressure molding, or otherwise.

Thus an excellent, highly satisfactory procedure consists of extruding an active material-polybutene-water dough or paste. The consistency of the paste may be varied by the amount of water or other liquid present, optimum consistency depending upon the particular device used for extrusion and/or the particular active material employed. A satisfactory method of deriving such a paste is by controlling the amount of water left in the filter cake obtained by filtration of slurries as described above. The amount of water in the filter cake may be controlled by the degree of air-blowing in the filter before discharging the cake.

A paste suitable for extrusion may also be prepared by intensively mixing polybutene with the dry active material in the presence of sufficient water to confer the desired consistency to the finished paste.

Pastes prepared in the described manner may be extruded into agglomerates by means of any suitable extrusion device. Among such devices there may be mentioned extruders in which the paste is moved by the action of an auger and forced through a die plate having multiple openings of any desired design; extruders in which the paste is fed into the chamber where a revolving wheel traveling on the circumference of a circular die plate forces the paste through the openings thereof; and granulators such as Stokes granulators, in which the paste is dropped onto a curved screen over which a bar oscillates and thus forces the paste through the screen.

The extrudate may then be dried by any convenient means, and the dried product may be screened if desired in order to remove such small amount of residual powder as may be present. Said powder may, of course, be recycled in subsequent batches.

It is noteworthy that the moist extrudates may be dried more quickly than bulky masses (such as filter cakes) of the corresponding untreated antioxidants containing comparable amounts of water.

A number of extruded antioxidants were prepared in order to evaluate the mechanical stability of antioxidants in extruded form and to evaluate the incorporation rate of extruded antioxidants in synthetic and natural rubber. The extruded antioxidants were prepared in accordance with the following examples.

EXAMPLE 1

120 grams of phenyl-β-naphthylamine powder were suspended by agitating the powder in 750 ml. of water using a Cowles-type, high-speed agitator. To the agitated suspension were added 21 grams of a 30% by weight emulsion of polybutene, containing 5% total oils and having an average molecular weight of 1100. This mixture was stirred for 30 minutes, at the end of which time the blend was filtered, extruded and dried in a non-circulating oven at a temperature of 83° C. 112 grams of soft pellets having a particle size greater than 10 mesh were recovered.

EXAMPLE 2

120 grams of N,N'-di-β-naphthyl-p-phenylenediamine powder were suspended in 750 ml. of water by agitating the mixture with a Cowles-type high-speed agitator. To this agitated suspension were added 21 grams of a 30% by weight emulsion of polybutene, containing 5% total oils and having an average molecular weight of 1100. The mixture was agitated for 30 minutes, at the end of which time it was filtered. The filtered cake was extruded and the pellets were dried in an oven at a temperature of 82° C. 108 grams of soft pellets having a particle size larger than 10 mesh were recovered.

EXAMPLE 3

120 grams of sym-diphenyl-p-phenylenediamine powder were suspended in 700 ml. of water by agitating the suspension with a Cowles-type high-speed agitator. To the agitated suspension were added 21 grams of a 30% by weight polybutene emulsion, containing 5% total oils and having an average molecular weight of 1100. The mixture was agitated for 30 minutes, at the end of which time the slurry was filtered. The filtered cake was extruded, and the pellets were dried in an oven at a temperature of 63° C. to 65° C. 110 grams of hard pellets having a particle size larger than 10 mesh were recovered.

EXAMPLE 4

120 grams of bis(2-hydroxy)-3-tert-butyl-5-methylphenylmethane were suspended in 700 ml. of water by agitating the suspension with a Cowles-type high-speed agitator. To the agitated suspension were added 21 grams of a 30% by weight polybutene emulsion, containing 5% total oils having an average molecular weight of 1100. The suspension was stirred for 30 minutes, at the end of which time the slurry was filtered. The filtered cake was extruded and dried in an oven at a temperature of 63° C. to 65° C. 114 grams of soft, dry pellets were recovered.

EXAMPLE 5

120 grams of the reaction product of acetone and diphenylamine, 0.25 gram of Triton X-100, an alkylaryl polyether alcohol, and 600 ml. of water were mixed together using a Cowles-type high-speed agitator. To this mixture were added 6.3 grams of a 30% by weight polybutene emulsion, containing 5% total oils and having an average molecular weight of 1100. The polybutene emulsion was added in a thin stream and the blend was agitated for 30 minutes prior to filtration of the slurry. The filtered cake was extruded and dried in an oven at a temperature of 45° C. 110 grams of hard, dry pellets were recovered.

EXAMPLE 6

120 grams of finely divided reaction product of acetone and p-aminobiphenyl were suspended by agitation in 700 ml. of water containing 0.25 gram of Triton X-100. This suspension was agitated by a Cowles-type high-speed agitator and 6.3 grams of a 30% by weight polybutene emulsion, containing 5% total oils and having an average molecular weight of 1100, were added to the suspension while continuing the agitation. The suspension was agitated for 30 minutes, and then filtered. The filtered cake was extruded and dried in an oven at a temperature of 45° C. 114 grams of hard, dry pellets were recovered.

EXAMPLE 7

The extruded antioxidants, prepared according to the procedures of Examples 1 to 6 above, were evaluated for mechanical stability.

In this test 25 grams of the extruded material to be evaluated, free from fines, were placed in a 16-ounce, wide mouth, French square, screw-capped bottle. The bottle was closed and rotated end over end at a speed of 75 revolutions per minute. This was effected by placing the square bottle in a cylindrical roller which was then rotated on a pebble mill roller.

At the end of 10 minutes, the product was screened through a 10 mesh screen and the portion passing through the screen was considered to be the fines. The fines were weighed and the percentage by weight of the fines was calculated, this latter value being denoted as the percent instability.

The results of this test are as follows:

*Stability Test for Extruded Antioxidants*

| Extruded Antioxidant | Wt. of Fines After Test (Grams) | Percent of Fines After Test |
|---|---|---|
| Phenyl-β-naphthylamine | 0.05 | 2.0 |
| N,N'-di-β-naphthyl-p-phenylenediamine | 1.25 | 5.0 |
| Sym-diphenyl-p-phenylenediamine | 2.00 | 8.0 |
| Bis(2-hydroxy)-3-tert-butyl-5-methylphenylmethane | 2.50 | 10.0 |
| Reaction product of acetone and diphenylamine | 2.50 | 10.0 |
| Reaction product of acetone and p-aminobiphenyl | 1.25 | 5.0 |

EXAMPLE 8

A comparative evaluation was made of the incorporation rates of powdered (no polybutene or other binder added) and extruded antioxidants into GR-S stock. The extruded antioxidants employed were those prepared in Examples 1 to 6 above.

In this test, a GR-S stock was employed which contained, for each 100 parts of GR-S 1000, 60 parts of finely divided calcium carbonate and 20 parts of titanium dioxide pigment. 400 grams of this stock were milled to a smooth band on a 6-inch mill with the mill opening set at 0.05 inch and using a roll temperature of 125° F. to 135° F. 100 grams of antioxidant powder, or an equivalent weight of extruded antioxidant, were added as fast as possible. None of the antioxidant which fell through the mill was added from the pan. When all the antioxidant had gone into the batch for the first pass, the time was noted and the batch was cut off the mill. All the antioxidant which fell through the mill to the pan was collected and weighed. The batch was again placed on the mill and all of the antioxidant which had fallen through the mill was worked in as quickly as possible and the time for complete incorporation was noted. The results are as follows:

Incorporation of antioxidants into GR-S

| Antioxidant | Time for First Pass | | Amount Thru (Grams) | Time for Remainder, Mins. | Total Time for Incorporation | |
|---|---|---|---|---|---|---|
| | Hrs. | Mins. | | | Hrs. | Mins. |
| Phenyl-β-naphthylamine (Powder) | 1 | 27 | 0.25 | 41 | 2 | 8 |
| Phenyl-β-naphthylamine (Extruded) | | 46 | 5.25 | 24 | 1 | 10 |
| N,N'-di-β-naphthyl-p-phenylenediamine (Powder) | 1 | 15 | 3.25 | 45 | 2 | 0 |
| N,N'-di-β-naphthyl-p-phenylenediamine (Extruded) | 1 | 3 | 3.50 | 32 | 1 | 35 |
| Sym-diphenyl-p-phenylenediamine (Powder) | | 56 | 1.25 | 12 | 1 | 8 |
| Sym-diphenyl-p-phenylenediamine (Extruded) | | 35 | 1.50 | 10 | | 45 |
| Bis(2-hydroxy)-3-tert-butyl-5-methylphenyl-methane (Powder) | | 39 | 0.50 | 8 | | 47 |
| Bis(2-hydroxy)-3-tert-butyl-5-methylphenyl-methane (Extruded) | | 29 | 1.00 | 8 | | 37 |
| Reaction product of acetone and diphenylamine (Powder) | | 29 | 0.25 | 11 | | 40 |
| Reaction product of acetone and diphenylamine (Extruded) | | 31 | 0.25 | 11 | | 42 |
| Reaction product of acetone and p-aminobiphenyl (Powder) | 1 | 17 | 0.25 | 8 | 1 | 25 |
| Reaction product of acetone and p-aminobiphenyl (Extruded) | | 21 | trace | 5 | | 26 |

EXAMPLE 9

A comparative test was made to evaluate the incorporation rate of powdered and extruded antioxidants into a natural rubber stock. The extruded antioxidants employed were those prepared in Examples 1 to 6 above.

The natural rubber stock employed contained, for each 100 parts of smoked sheet rubber, 10 parts of light oil, 10 parts of paracoumarone resin, 25 parts of whiting, and 10 parts of titanium dioxide pigment. The smoked sheet rubber was taken from the outside of a bale and milled for 15 minutes on a cold tight mill, with not over 1500 grams of rubber on the mill. The batch was allowed to rest for 24 hours and remilled for 15 minutes on a cold, tight mill. The batch was then rested at least 3 hours before mixing the master batch.

310 grams of the master batch was run smoothly on a 12-inch mill with the mill opening set at 0.062 inch and using a roll temperature of 150° F. 50 grams of antioxidant powder, or an equivalent weight of extruded antioxidant, were added as rapidly as possible to the mill and the time for incorporation was noted. As soon as incorporation was complete, the batch was cut off of the mill.

The comparative incorporation times for the powdered and extruded antioxidants are as follows:

Incorporation of antioxidants into natural rubber

| Antioxidant | Incorporative Time | |
|---|---|---|
| | Hrs. | Mins. |
| Phenyl-β-naphthylamine (Powder) | 3 | 9 |
| Phenyl-β-naphthylamine (Extruded) | | 55 |
| N,N'-di-β-naphthyl-p-phenylenediamine (Powder) | 1 | 40 |
| N,N'-di-β-naphthyl-p-phenylenediamine (Extruded) | 1 | 20 |
| Sym-diphenyl-p-phenylenediamine (Powder) | 1 | 16 |
| Sym-diphenyl-p-phenylenediamine (Extruded) | 1 | 18 |
| Bis(2-hydroxy)-3-tert-butyl-5-methylphenyl-methane (Powder) | 1 | 30 |
| Bis(2-hydroxy)-3-tert-butyl-5-methylphenyl-methane (Extruded) | 1 | 12 |
| Reaction product of acetone and diphenylamine (Powder) | | 59 |
| Reaction product of acetone and diphenylamine (Extruded) | | 45 |

It will be seen from the foregoing data that in practically every case a substantial improvement in incorporation time was realized when using the extruded material rather than the powdered material.

EXAMPLE 10

Determination of the dust index affords an excellent means for evaluating the dusting characteristics of antioxidants or of compositions containing antioxidants.

A suitable apparatus for determining this index comprises a 34-inch length of 50 mm. glass tubing, open at one end, the other end being drawn to a V and having a U tube of 7 mm. glass tubing sealed thereto. The large tube is provided with an opening which is 7 inches from this junction, and which is large enough to permit the horizontal insertion of a microscope slide when the apparatus is in operating position, this position being vertical with the open end at the top.

The U tube is connected to a compressed air line in which the pressure is 3 pounds per square inch gauge. A one gram sample is placed in the V-shaped part of the tube. A cloth held by a rubber band is placed over the upper end of the apparatus and the slit for the microscope slide is covered to prevent loss of sample during agitation. The sample is blown upward into the 50 mm. section of the apparatus by passing compressed air in through the U tube for 30 seconds. The air is then shut off and 15 seconds later a microscope slide is placed in the slit and allowed to remain for 60 seconds. The number of dust particles per square millimeter on the slide is determined microscopically. This value is called the dust index. A low index denotes a product of good non-dusting properties, while a high index denotes dustiness.

The data below show the dust indexes of a variety of antioxidants, as determined by the above method. The powdered antioxidants were commercial grade products, to which nothing further had been added, and the extruded forms were prepared according to the procedures of Examples 1 to 6 above.

| Antioxidant | Powder | | Extruded Form | | | |
|---|---|---|---|---|---|---|
| | Ultimate Particle Size, Microns | Dust Index | Ultimate Particle Size, Microns | Dust Index | Hard Particles | Case Hardened |
| 1. Phenyl-β-naphthylamine | 2.02 | 17 | 1.77 | 0 | Yes | Yes. |
| 2. N,N'- di -β-naphthyl - p - phenylenediamine. | 1.8 | 8 | 2.3 | 6 | No | No. |
| 3. Sym-diphenyl-p-phenylenediamine | 2.62 | 134 | 1.97 | 3 | No | No. |
| 4. Bis(2 - hydroxy) - 3 - tert-butyl-5-methyl-phenylmethane. | 2.35 | 134 | 1.72 | 3 | No | No. |
| 5. Reaction product of acetone and diphenylamine. | 1.70 | 18 | 1.80 | 2 | No | No. |
| 6. Reaction product of acetone and p-aminobiphenyl. | 1.72 | 23 | 1.52 | 0 | Yes | Yes. |

The dust indexes of the powdered antioxidants are probably low in all cases, since some powder was blown through the cloth during the agitation period. In the cases of N,N'-di-β-naphthyl-p-phenylenediamine and the reaction product of acetone and diphenylamine the loss was extremely large.

This application is a continuation-in-part of my co-pending applications, Serial Numbers 202,571 and 202,572, both of which were filed on December 23, 1950.

It is to be understood that the above particular description is by way of illustration, and not of limitation, and that changes, omissions, additions, substitutions and/or modifications may be made without departing from the spirit of the invention.

Accordingly, it is intended that the patent shall cover whatever features of patentable novelty reside in the invention.

I claim:

1. The rubber antioxidant product comprising a solid aromatic secondary amine antioxidant in intimate admixture with a polybutene material of the group consisting of polybutene and hydrogenated polybutene, the average molecular weight of the polybutene material being between 500 and 5000 and the amount admixed being between 1 and 10% based on the said antioxidant.

2. The rubber antioxidant product comprising a member selected from the group of antioxidants consisting of:

Mixture of phenyl-β-naphthylamine, p-isopropoxy diphenylamine and diphenyl p-phenylene diamine;
Mixture of phenyl-β-naphthylamine and diphenyl p-phenylene-diamine;
Phenyl-β-naphthylamine;
N,N'-dibetanaphthyl p-phenylenediamine;
Condensation product of acetone and aniline;
Phenyl-α-naphthylamine;
Di-orthotolylguanidine salt of dicatechol borate;
Reaction product of acetone and para amino diphenyl;
Phenyl-β-naphthylamine (50%), di-para-methoxy diphenylamine (25%), diphenyl p-phenylamine diamine (25%);
Sym-diphenyl-p-phenylenediamine;
Reaction product of acetone and diphenylamine;
Para cyclohexylaminophenylamine;

in intimate admixture with a polybutene material of the group consisting of polybutene and hydrogenated polybutene, the average molecular weight of the polybutene material being between 500 and 5000 and the amount admixed being between 1 and 10% based on the said antioxidant.

3. The process comprising intimately admixing a normally solid aromatic secondary amine antioxidant with a polybutene material of the group consisting of polybutene and hydrogenated polybutene the average molecular weight of the polybutene material being between 500 and 5000 and the amount admixed being between 1 and 10% based on the said antioxidant.

4. The process comprising intimately admixing a normally solid rubber antioxidant selected from the group consisting of:

Mixture of phenyl-β-naphthylamine, p-isopropoxy diphenylamine and diphenyl p-phenylene diamine;
Mixture of phenyl-β-naphthylamine and diphenyl p-phenylene-diamine;
Phenyl-β-naphthylamine;
N,N'-dibetanaphthyl p-phenylenediamine;
Condensation product of acetone and aniline;
Phenyl-α-naphthylamine;
Di-orthotolylguanidine salt of dicatechol borate;
Reaction product of acetone and para amino diphenyl;
Phenyl-β-naphthylamine (50%), di-para-methoxy diphenylamine (25%), diphenyl p-phenylamine diamine (25%);
Sym-diphenyl-p-phenylenediamine;
Reaction product of acetone and diphenylamine;
Para cyclohexylaminophenylamine;

with a polybutene material of the group consisting of polybutene and hydrogenated polybutene the average molecular weight of the polybutene material being between 500 and 5000 and the amount admixed being between 1 and 10% based on the said antioxidant.

5. A product of claim 1 in which said material admixed is polybutene.

6. A product of claim 1 in powder form.

7. A product of claim 1 in agglomerate form.

8. The process of claim 3 wherein the admixing takes place in the presence of water and is followed by a filtration and drying of the product produced.

9. The process of claim 8 in which the drying is carried to substantial completion and is followed by pulverization of the dry product.

10. The process of claim 3 in which the drying is carried to the formation of a product of pasty consistency, which product is extruded into small shapes which are subsequently dried.

References Cited in the file of this patent

UNITED STATES PATENTS

| 2,457,962 | Whaley | Jan. 4, 1949 |
| 2,462,123 | Nelson | Feb. 22, 1949 |
| 2,653,924 | Olin | Sept. 29, 1953 |
| 2,653,925 | Olin | Sept. 29, 1953 |
| 2,765,292 | Groff et al. | Oct. 2, 1956 |

OTHER REFERENCES

Industrial and Engineering Chemistry, August 1939, pages 941–942.

Du Pont Rubber Chemicals, Report No. 43-1, page 61, February 1943.